United States Patent
Ma et al.

(10) Patent No.: US 9,244,274 B2
(45) Date of Patent: Jan. 26, 2016

(54) REDUCING OPTICAL ABERRATIONS WITH GRADED-INDEX OPTICS

(71) Applicant: Lumentum Operations LLC, Milpitas, CA (US)

(72) Inventors: Xiuquan Ma, Fremont, CA (US); Dmitriy Panasenko, Castro Valley, CA (US); Martin H. Muendel, Oakland, CA (US)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 14/100,565

(22) Filed: Dec. 9, 2013

(65) Prior Publication Data

US 2015/0160468 A1 Jun. 11, 2015

(51) Int. Cl.
*G02B 3/00* (2006.01)
*G02B 27/30* (2006.01)
*G02B 27/00* (2006.01)

(52) U.S. Cl.
CPC .......... *G02B 27/0025* (2013.01); *G02B 3/0087* (2013.01)

(58) Field of Classification Search
CPC ....................................................... G02B 3/0087
USPC ............................................. 359/641, 652, 654
See application file for complete search history.

(56) References Cited

U.S. PATENT DOCUMENTS 6,016,224 A * 1/2000 Namiki ......................... 359/619

OTHER PUBLICATIONS

LightPath Technologies—2006 Product Catalog, Gradium Lens, pp. 26-29.
j-fiber Jena—Multimode Preform 50-125; DB-PN-001-01-0607 Issued Jun. 2007.

* cited by examiner

*Primary Examiner* — William Choi
(74) *Attorney, Agent, or Firm* — Harrity & Harrity, LLP

(57) ABSTRACT

An aberration corrector and a method to reducing a spherical aberration are disclosed. The aberration corrector has a radial, rotationally symmetric variation of refractive index including a term varying in proportion to a fourth degree of a distance from the optical axis. Since the spherical aberration causes a wavefront deviation proportional to the fourth degree of distance from the optical axis, the spherical aberration can be reduced by the aberration corrector when its thickness causes the exact amount of the phase delay corresponding to the wavefront deviation, but with an opposite sign.

14 Claims, 8 Drawing Sheets

20.00 microns

70A 0.40 microns

70B

REDUCING OPTICAL ABERRATIONS WITH GRADED-INDEX OPTICS

TECHNICAL FIELD

The present invention relates to optical devices, and in particular for devices and methods for reducing optical aberrations.

BACKGROUND OF THE INVENTION

Optical aberrations are deviations of optical rays that prevent the rays from being focused into a single point. From the viewpoint of wave optics, optical aberrations are deviations of a wavefront of an optical beam from exactly planar or spherical wavefront. These deviations prevent the optical beam from being focused into a tight, diffraction-limited spot. Perhaps the most common optical aberration is a spherical aberration caused by lenses having spherical surface shape(s). Spherical lenses are the easiest to produce, due to the polishing naturally resulting in spherical shape of lenses. However, spherical lenses cannot focus wide light beams into diffraction-limited spots, because a spherical surface tends to over-focus marginal rays impinging far from the lens center, and under-focus central rays, blurring the focal spot. It is this geometrical property of spherical lenses with uniform refractive index that results in the spherical aberration.

A spherical aberration can be compensated by providing a compound lens having several spherical surfaces disposed so that the spherical aberrations due to individual spherical surfaces work in opposite directions. Another method is to produce an aspherical surface, either by utilizing a computerized local polishing system, which spends pre-programmed different amount of time on the lens center and the lens peripheral areas, or by injection molding using a diamond-turned aspheric mold. Both the compound and polished-aspheric lenses are relatively expensive. Injection-molded aspheric lenses can be made less expensive than the polished-aspheric lenses when mass-produced, but at present, injection-molded aspheric lenses cannot be made to a diameter larger than approximately one centimeter, for technological reasons.

A more economical method, which also works with lens diameters as large as five to eight centimeters, includes using axial gradient-index materials. Referring to FIGS. 1A to 1D, a process of making a Gradium™ lens, manufactured by LightPath Technologies Inc, Orlando, Fla., USA, is illustrated. A few layers of glass 11 (FIG. 1A) having gradually increasing refractive indices (from bottom to top; shown with different degree of shading) are fused together to obtain an index-graded blank 12 (FIG. 1B) having a refractive index profile 19 (FIG. 1D) that varies as a function of the depth coordinate, as shown, while being uniform horizontally (that is, perpendicular to the plane of FIGS. 1A to 1D). The blank 12 is then polished using usual spherical lens polishing techniques to obtain a spherical lens 13 with an axially-graded refractive index (FIG. 1C). Due to the axially-graded refractive index, edges 14 of the spherical lens 13 do not refract light rays as strongly as they would if the refractive index were not axially graded. Due to the less strong refraction of light at the edges 14 of the spherical lens 13, the spherical aberration introduced by the spherical lens 13 is reduced.

One drawback of the lens 13 is that, although it can lessen its own spherical aberration, it usually is not made to compensate a spherical aberration of another lens. For instance, in FIG. 1B, the blank 12 is flat, and therefore it refracts optical rays in a same or similar manner as a non-graded blank of glass. When it is polished to a shape to form the lens 13, its spherical aberration compensation capability is fixed by the final polished spherical shape of the lens 13.

There are areas of technology where the amount of spherical aberration is either unknown or varies from one manufactured device to another. By way of a non-limiting example, a spherical aberration can appear in a laser gain medium, or in a laser absorber medium upon self-focusing of a laser beam due to thermal lensing or non-linear optical (Kerr) effects in that medium. Since manufacturing laser systems usually involves some degree of alignment, e.g. a translation of a lens to optimize the focusing of a laser beam in the gain or absorber medium, the resulting spherical aberration of the laser beam inevitably varies from device to device, impacting the output laser beam quality. It would be beneficial to provide an optical element or device capable to compensate this variable spherical aberration of the thermal lens. In another example, setting up or aligning an optical device can involve selecting one of several spherical lenses to choose from for use in the device. Since spherical aberration depends on focal length and refractive index of the lens, it would be advantageous to provide a spherical aberration compensator, which could be easily tuned to compensate different amount of spherical aberration.

SUMMARY OF THE INVENTION

Spherical aberration causes a deviation of the beam wavefront from a planar wavefront. This deviation is usually rotationally symmetric. An optical element that has a radial, rotationally symmetric variation of the refractive index, matching the radial deviation of the aberrated wavefront from a planar wavefront, will compensate or lessen the aberration. In a spherically aberrated optical beam, the wavefront deviation varies as a fourth degree of a distance r from the optical axis, that is, proportional to $r^4$. Therefore, the refractive index of the spherical aberration-compensating optical element should vary as a fourth degree of a distance from the optical axis. Such an aberration compensator can have flat optical surfaces, and thus it can be easily polished to a thickness required to match a particular amount of spherical aberration of the optical beam's wavefront.

In accordance with the invention, there is provided an optical apparatus comprising:

a first element having optical power when an optical beam propagates therethrough, for collimating the optical beam to produce a collimated beam having a wavefront, wherein the wavefront has a spherical aberration introduced by the first element upon collimating the optical beam; and an aberration corrector optically coupled to the first element for receiving the collimated optical beam, the aberration corrector having an optical axis disposed generally along the collimated optical beam, and a refractive index n varying with a distance r from the optical axis, as defined by the formula $$n(r) = n_0 + a \cdot r^2 + b \cdot r^4;$$

wherein $n_0$ is a constant, $a \cdot r^2$ is a radially varying second-degree refractive index component, and $b \cdot r^4$ is a radially varying fourth-degree refractive index component for lessening the spherical aberration of the collimated optical beam.

In one embodiment, a magnitude of the quadratic coefficient a is substantially zero, e.g. less than $2 \cdot 10^{-4}$ mm$^{-2}$ at a wavelength of 1 micrometer, so that the aberration corrector can be made to a length sufficient for compensating the spherical aberration introduced by the first element, while substantially not re-focusing the collimated optical beam. The aberration corrector may have at least one flat optical face, for ease of polishing. In another embodiment, the quadratic coefficient a is selected to be of such a magnitude that a half-pitch length of the aberration corrector, repeating the shape of the original optical beam, is sufficient to approximately compensate the optical aberration introduced by the first element.

In accordance with the invention, there is further provided a method for lessening a spherical aberration of a collimated optical beam, the method comprising (a) providing an aberration corrector having an optical axis and a refractive index n varying with a distance r from the optical axis, as defined by the formula $n(r)=n_0+a \cdot r^2+b \cdot r^4$;

wherein $n_0$ is a constant, $a \cdot r^2$ is a radially varying second-degree (quadratic) refractive index component, and $b \cdot r^4$ is a radially varying fourth-degree refractive index component for lessening the spherical aberration of the collimated optical beam; and (b) disposing the aberration corrector of step (a) in an optical path of the collimated optical beam, so that the optical axis is disposed generally along the optical beam.

In one embodiment, the coefficient b has a pre-defined magnitude of at least $10^{-6}$ mm$^{-4}$, and a is less than $10^{-2}$ mm$^{-2}$ at a wavelength of 1 micrometer, the above method including further steps (c) upon completing step (b), measuring a first parameter characteristic of the spherical aberration;

(d) upon completing step (c), affixing the aberration corrector in a holder of a polishing station, and polishing off a length of the aberration corrector along the optical axis thereof;

(e) re-measuring the first parameter by repeating steps (b) and (c); and (f) repeating steps (d) and (e) to further lessen the spherical aberration.

In accordance with another aspect of the invention, there is further provided a method of tuning a laser by lessening a spherical aberration according to the above aberration lessening method, the laser having therein a thermal lens generating the spherical aberration of a laser beam of the laser, wherein the collimated optical beam comprises the laser beam, the method including lessening the spherical aberration of the laser beam by performing steps (a) through (f), wherein in step (c), measuring the first parameter comprises measuring an $M^2$ value of the laser beam.

In accordance with another aspect of the invention, there is further provided a gradient-index optical element for lessening a spherical aberration of a collimated optical beam propagating therethrough, the gradient-index optical element having an optical axis and a refractive index n varying with a distance r from the optical axis, as defined by the formula $n(r)=n_0+a \cdot r^2+b \cdot r^4$;

wherein $a<2 \cdot 10^{-4}$ mm$^{-2}$ and $b \geq 10^{-6}$ mm$^{-4}$ at a wavelength of 1 micrometer. The gradient-index optical element can have at least one flat optical face for receiving or outputting the collimated optical beam.

BRIEF DESCRIPTION OF THE DRAWINGS

Exemplary embodiments will now be described in conjunction with the drawings, in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1A:
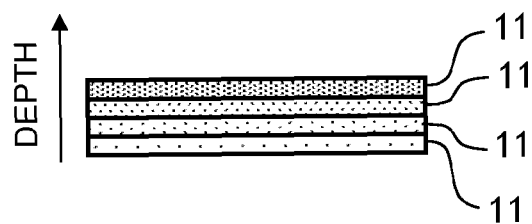
FIGS. 1A to 1C are side schematic views of an un-fused glass stack, fused glass stack, and a polished Gradium lens, respectively, of the prior art.
Figure 1B:
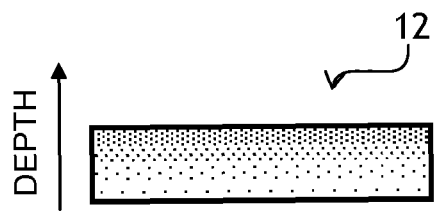
Figure 1C:
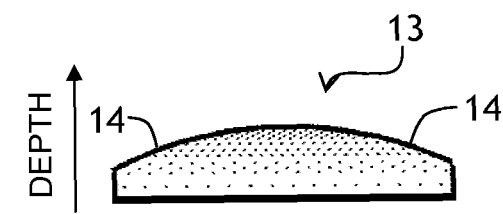
Figure 1D:
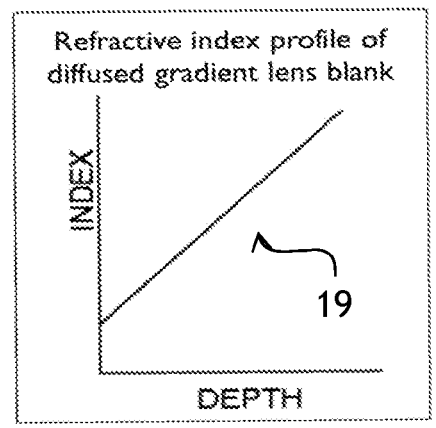
FIG. 1D is an axial refractive index profile of the Gradium lens of FIG. C.
Figure 2A:
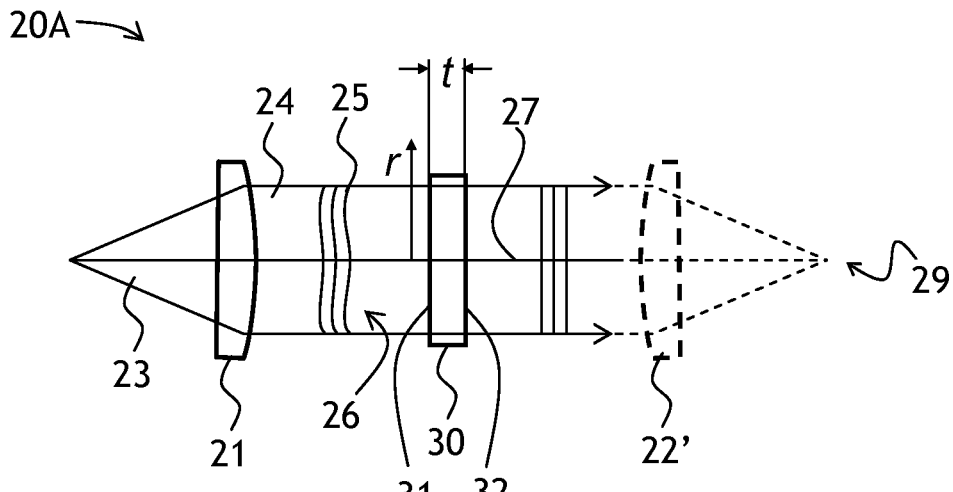
FIGS. 2A and 2B are side schematic views showing embodiments of an optical apparatus of the invention.
Figure 2B:
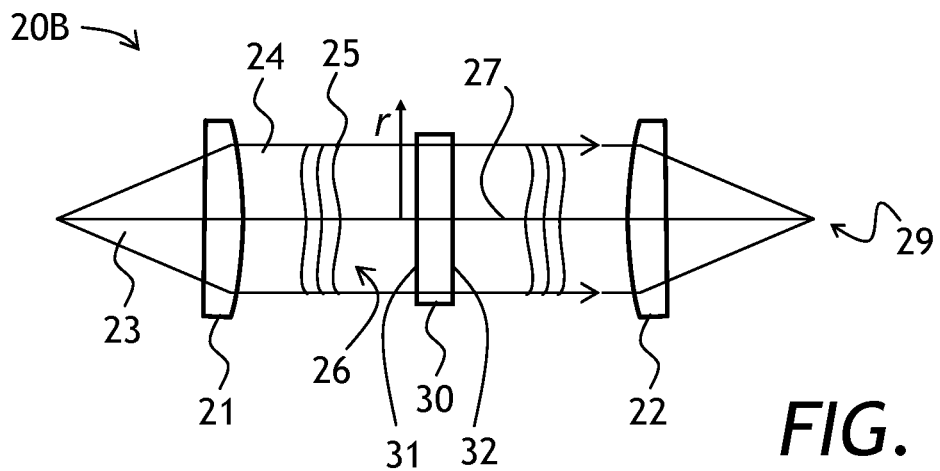
Figure 3:
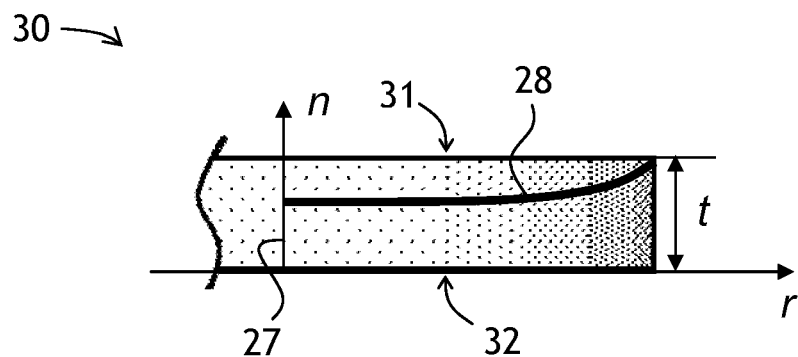
FIG. 3 is a side cross-sectional view of an aberration corrector of the invention usable in the apparatus of FIGS. 2A and 2B, showing a superimposed radial profile of the aberration corrector's refractive index.

Referring to FIGS. 2A and 2B, an optical apparatus 20A of the invention includes a first optical element, or a first lens 21 for collimating a diverging optical beam 23, to produce a collimated beam 24 having a wavefront 25, which has a spherical aberration 26 introduced by the first lens 21 upon collimating the diverging optical beam 23. An aberration corrector 30 is optically coupled to the first lens 21. In the embodiment shown, the aberration corrector 30 has flat faces 31 and 32, respectively, for receiving and outputting the collimated optical beam 24. The aberration corrector 30 has an optical axis 27 disposed parallel to the collimated optical beam. Referring to FIG. 3, the aberration corrector 30 has a refractive index n varying with a distance r from the optical axis, as defined by the formula $$n(r)=n_0+a \cdot r^2+b \cdot r^4 \quad (1)$$

where $n_0$ is a constant, $a \cdot r^2$ is a quadratic term (or quadratic component) generally responsible for focusing the optical beam 24, and $b \cdot r^4$ is a radially varying fourth-degree (sometimes termed "fourth-order") refractive index component 28 (FIG. 3) for lessening the spherical aberration 26 of the collimated optical beam 24. The refractive index n does not vary in the axial direction, that is, the refractive index n does not vary along the optical axis 27. The refractive index variation defined by Eq. (1) can be created by creating a corresponding radial doping profile in a glass blank or an optical fiber, as known to persons skilled in the art.

According to one embodiment of the invention, a magnitude of the quadratic coefficient a is small enough, so that substantially no focusing of the collimated light beam 24 by the aberration corrector 30 occurs. For example, |a| can be less than $10^{-2}$ mm$^{-2}$ at a wavelength of 1 micrometer, or merely be as close to zero as practical, e.g. less than $2 \cdot 10^{-4}$ mm$^{-2}$. This allows a thickness t of the aberration corrector to be adjusted so as to compensate, or at least to lessen as much as possible, the spherical aberration 26 of the collimated optical beam 24. The thickness t can be adjusted by polishing one of the flat faces 31 and 32 of the aberration corrector 30, although the faces 31 and 32 do not need to be flat when some additional focusing or collimating is required. At least one flat face 31 or 32 is preferable.

Preferably, the magnitude of the fourth-degree coefficient b is at least $10^{-6}$ mm$^{-4}$ and more preferably at least $10^{-5}$ mm$^{-4}$ at the wavelength of 1 micrometer. The sign of b can depend on the sign of spherical aberration to be compensated, and can be both positive and negative. The value of b can be pre-defined during manufacturing of the aberration corrector 30, and the exact amount of spherical aberration correction can be adjusted by adjusting the thickness t e.g. by polishing the aberration corrector 30, so that the collimated optical beam 24 can be focused by an ideal lens 22' into a diffraction-limited spot 29. If required, the amount of aberration correction can include the spherical aberration of a second, focusing lens 22, as shown in an optical apparatus 20B of FIG. 2B. In other words, the wavefront 25 of the collimated optical beam 24 can be pre-corrected to compensate, or at least lessen, the spherical aberration of the second lens 22, or another optical element for that matter, disposed upstream or downstream the aberration corrector 30 in an optical path.

The first 21 and/or second 22 lenses can be spherical lenses or other optical elements having optical power e.g. focusing power, and causing spherical aberration of the collimated optical beam 24. In one embodiment, the first lens includes an absorbing or gain medium comprising a lens thermally induced in the absorbing or gain medium (not shown) by the optical beam 24 propagating in the absorbing or gain medium. The thermal lens is represented by the first lens 21. In this embodiment, the amount of spherical aberration generated by self-focusing in the absorbing or gain medium may not be exactly known. The amount of focusing capability, or optical focusing power, generated by the thermal lens 21 in the laser medium when the optical beam 24 propagates in the medium depends on many parameters, including intensity or local power density of the optical beam 24. The thickness t of the aberration corrector 30 can be adjusted to lessen the spherical aberration 26 due to the thermal lens 21. The aberration corrector may also be slightly tilted to prevent reflections of the collimated optical beam 24 from interfering with the laser performance. It is sufficient that the optical axis 27 be disposed generally along the collimated optical beam 24. Herein, the term "disposed generally along" includes small angles w.r.t. the collimated optical beam, for example up to 6 degrees or similar.

When the thickness t of the aberration corrector 30 is too small to be reliably held in a mounting bracket of a polishing machine, e.g. when the thickness t is no greater than 3 mm, a glass rod, not shown, can be affixed to the aberration corrector 30, for holding the aberration corrector 30 in the mounting bracket for polishing the flat optical face 31 or 32.

Conveniently, the aberration corrector 30 can be made out of a gradient-index (GRIN) rod manufactured using a technique similar to that of manufacturing GRIN rods for Selfoc™ lenses produced by Go!Foton Inc., Somerset, N.J., USA. Preferably, a GRIN rod having the radial refractive index distribution given by formula (1) above, has a diameter of no greater than 20 mm, and the magnitudes of |b| of at least $10^{-6}$ mm$^{-4}$ and more preferably at least $10^{-5}$ mm$^{-4}$ and |a| less than $10^{-2}$ mm$^{-2}$ and more preferably less than $2\cdot 10^{-4}$ mm$^{-2}$ at the wavelength of 1 micrometer. Alternatively, the aberration corrector 30 can be made in form of a gradient-index optical fiber having a diameter of no greater than 0.5 mm, of at least $10^{-6}$ mm$^{-4}$ and more preferably at least $10^{-5}$ mm$^{-4}$ and |a| less than $10^{-2}$ mm$^{-2}$ and more preferably less than $2\cdot 10^{-4}$ mm$^{-2}$ at the wavelength of 1 micrometer. Of course, light at other wavelengths can be used, and the wavelength of 1 micrometer is mentioned only for certainty of refractive index definition. When the aberration corrector 30 is made out of a gradient-index optical fiber, fusing a glass block for polishing purposes can be replaced with splicing a piece of a coreless fiber, e.g. when the length of the gradient-index optical fiber is no greater than 3 mm.

Figure 4A:
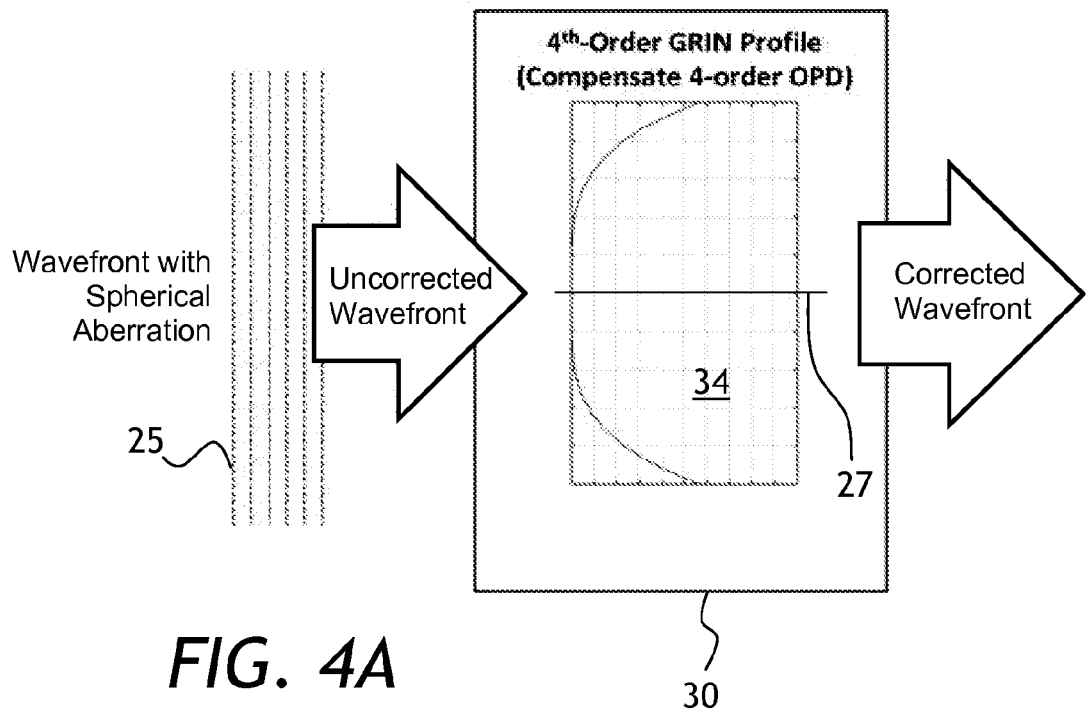
FIG. 4A is a schematic diagram illustrating the operation of the aberration corrector of FIG. 3.

Referring to FIG. 4A, the aberration corrector 30 is used to correct or compensate aberrations in the wavefront 25, wherein a magnitude of a deviation of phase of the wavefront 25 from a plane wave is described with a coefficient proportional to the fourth degree (sometimes termed "fourth order") of distance r from the optical axis 27. The wavefront 25 is corrected because it has a fourth-degree GRIN profile 34, which effectively introduces a phase delay proportional to the fourth degree of distance r from the optical axis 27, only with the opposite sign. Thus, the wavefront 25 becomes more flat, signifying a reduction of spherical aberration.

Figure 4B:
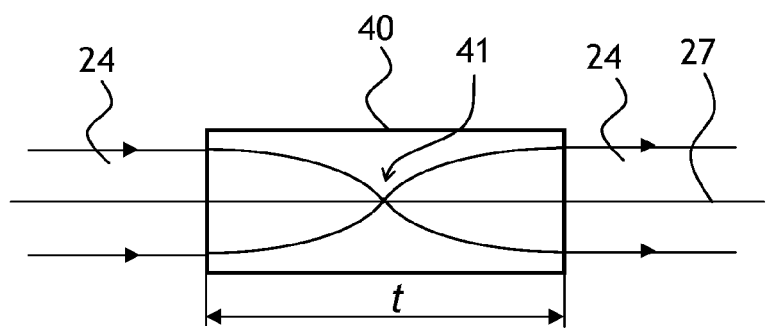
FIG. 4B is a side cross-sectional view of an alternative implementation of an aberration corrector according to the invention.

Turning to FIG. 4B, an aberration corrector 40 has the quadratic index coefficient a close to that of a GRIN lens, and the aberration corrector 40 has a length corresponding to half-pitch of the GRIN lens. The fourth-degree coefficient $|b| \geq 10^{-6}$ mm$^{-4}$ is also present to compensate or lessen spherical aberrations. When the collimated optical beam 24 enters the aberration corrector 40, the collimated optical beam 24 goes through an intermediate focus 41 before becoming collimated again. The benefit of this embodiment is that the aberration corrector 40 can be easily made long enough, with the optical beam 24 remaining well-collimated at its output; however, the adjustment of thickness t cannot be done, because in the aberration corrector 40 of FIG. 4B, the thickness changes will result in a change of focusing capability of the aberration corrector 40. Generally, the aberration corrector 40 can have the thickness t of substantially integer multiple of the half-pitch length.

Figure 5A:
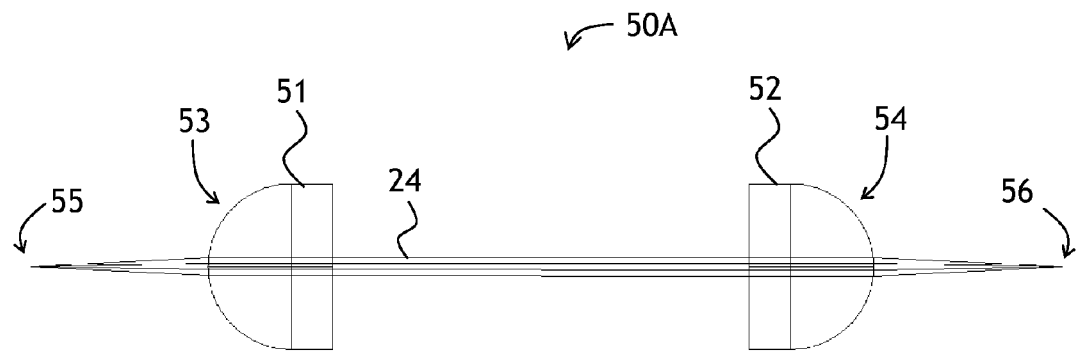
FIGS. 5A and 5B are side cross-sectional views of a lens pair without (FIG. 5A) and with (FIG. 5B) the aberration corrector of FIG. 3.

The performance of the aberration corrector 30 of FIG. 3 was verified by calculation. To that end, two lens systems were considered: one with an aberration corrector and one without, to perform "A vs. B" type comparison. Referring to FIG. 5A, a lens system 50A includes two spherical lenses 51 and 52 oriented so as to intentionally introduce a large amount of spherical aberration, that is, with concave surfaces 53 and 54 facing a point source of light 55 and a focused spot 56, respectively. A lens system 50B of FIG. 5B includes the same lenses as the lens system 50A of FIG. 5A, only in the lens system 50B of FIG. 5B, an aberration corrector 50 has been introduced in the collimated optical beam 24. The aberration corrector 50 corresponds to the aberration corrector 30 of FIGS. 2A, 2B, and FIG. 3. The refractive index profile of the aberration corrector 50 is shown in FIG. 5C. The lens parameters of the lens systems 50A and 50B of FIGS. 5A and 5B, respectively, are summarized in the following Tables A and B.

TABLE A

| Parameter | Value |
|---|---|
| Distance between the source 55 and the curved surface 53 of the first lens 51 | 21.36 mm |
| Thickness of the first lens 51 | 15 mm |
| Radius of curvature of the surface 53 of the first lens 51 | 10 mm |
| Distance between the first 51 and second 52 lenses | 50 mm |
| Thickness of the second lens 52 | 15 mm |
| Radius of curvature of the surface 54 of the second lens 52 | 10 mm |
| Distance between the curved surface 54 of the | 22.698 mm |

TABLE A-continued

| Parameter | Value |
|---|---|
| second lens 52 and the focal point 56 | |
| Material of the first 51 and second 52 lenses | Fused silica |

TABLE B

| Parameter | Value |
|---|---|
| Distance between the source 55 and the curved surface 53 of the first lens 51 | 21.36 mm |
| Thickness of the first lens 51 | 15 mm |
| Radius of curvature of the surface 53 of the first lens 51 | 10 mm |
| Distance between the first lens 51 and the aberration corrector 50 | 17.388 mm |
| Length of the aberration corrector 50 | 10.3 mm |
| Refractive index of the aberration corrector 50 | 1.45 |
| Fourth-degree coefficient b | $2.5 \cdot 10^{-5}$ mm$^{-4}$ |
| Distance between the aberration corrector 50 and the second lens 52 | 17.388 mm |
| Thickness of the second lens 52 | 15 mm |
| Radius of curvature of the surface 54 of the second lens 52 | 10 mm |
| Distance between the curved surface 54 of the second lens 52 and the focal point 56 | 23.106 mm |
| Material of the first 51 and second 52 lenses | Fused silica |

Figure 5B:
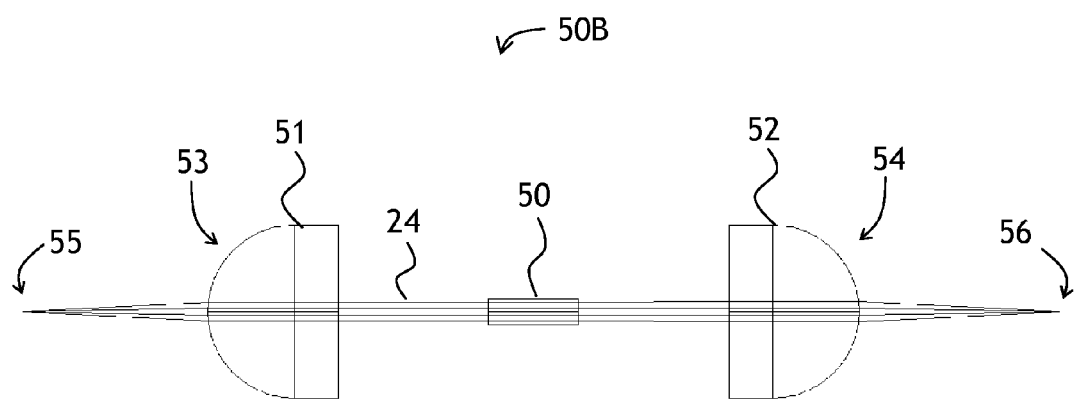
Figure 5C:
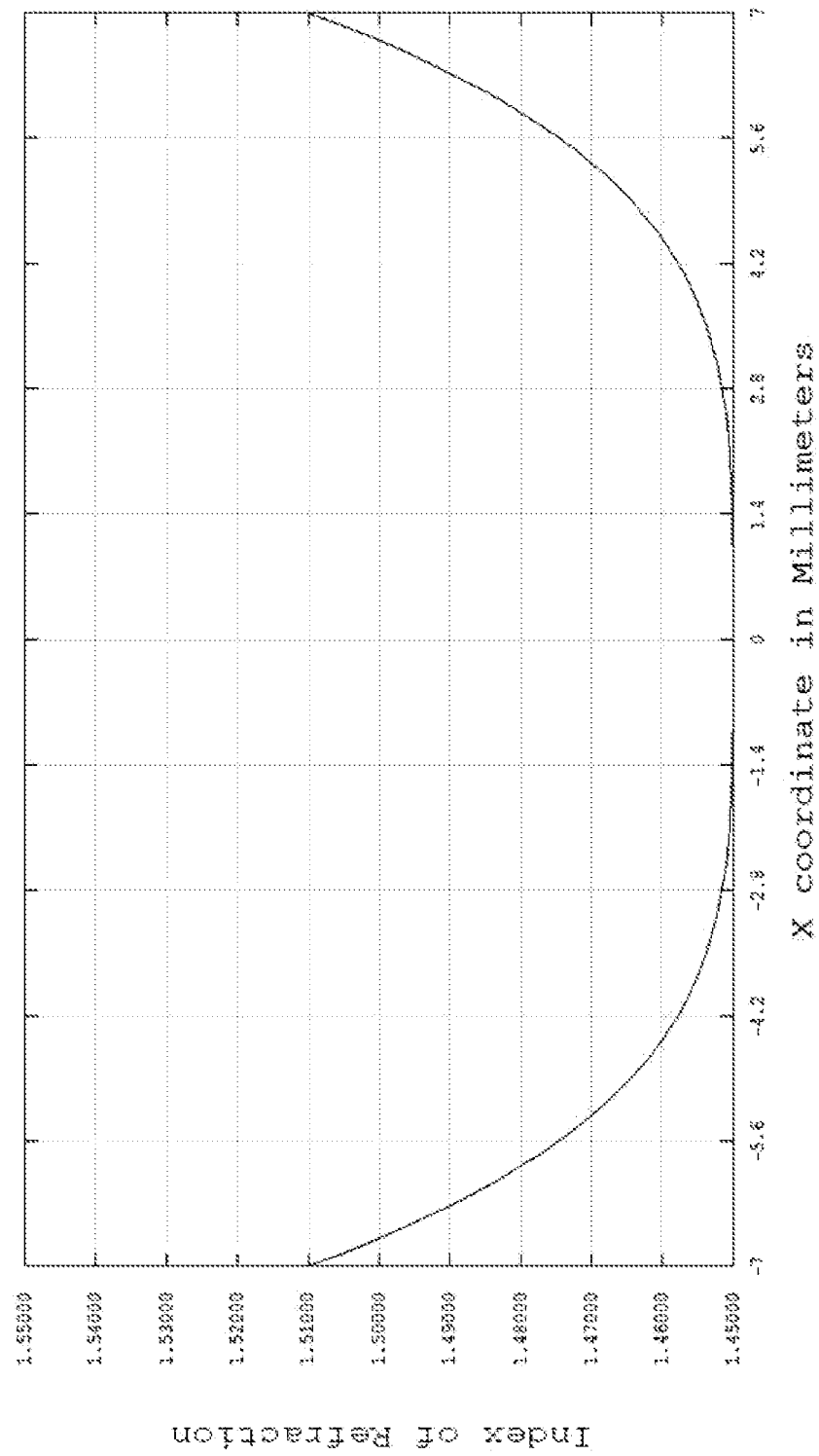
FIG. 5C is a radial refractive index profile of the aberration corrector of FIG. 5B.
Figure 6A:
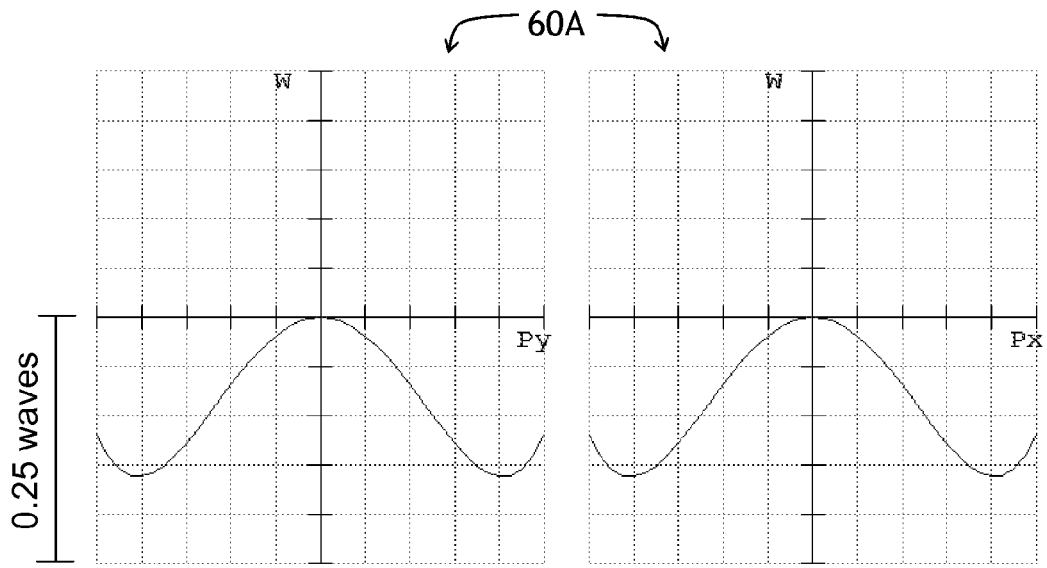
FIGS. 6A and 6B are optical path difference ray fans for the lens pairs of FIGS. 5A and 5B, respectively.
Figure 6B:
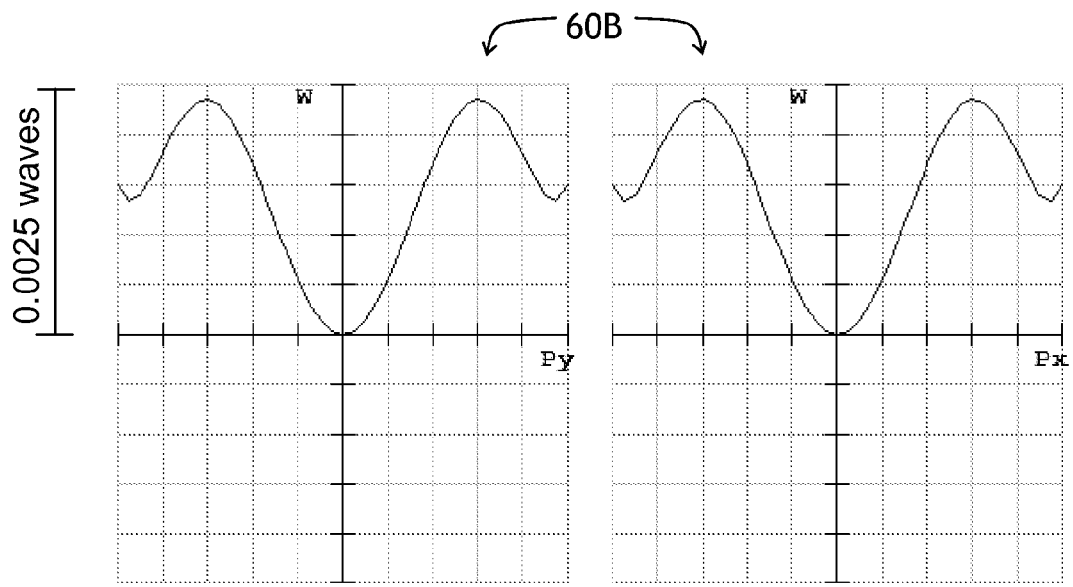

Referring to FIGS. 6A and 6B, calculated optical path difference ray fans 60A and 60B are plotted each as a function and X and Y coordinate in the image plane for the lens systems 50A and 50B of FIGS. 5A and 5B, respectively, at the wavelength of 1 micron. One can see that the presence of the aberration corrector 50 results in about ×90 improvement of the optical path difference.

Figure 7A:
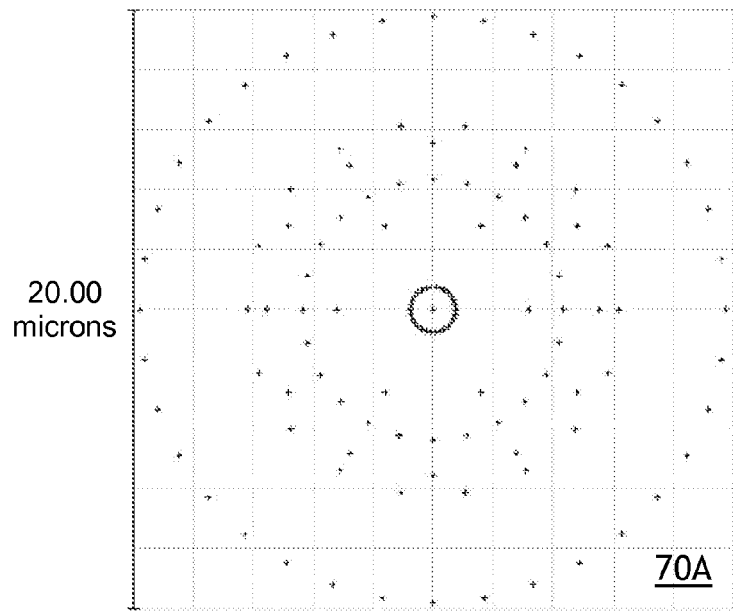
FIGS. 7A and 7B are spot diagrams for the lens pairs of FIGS. 5A and 5B, respectively.
Figure 7B:
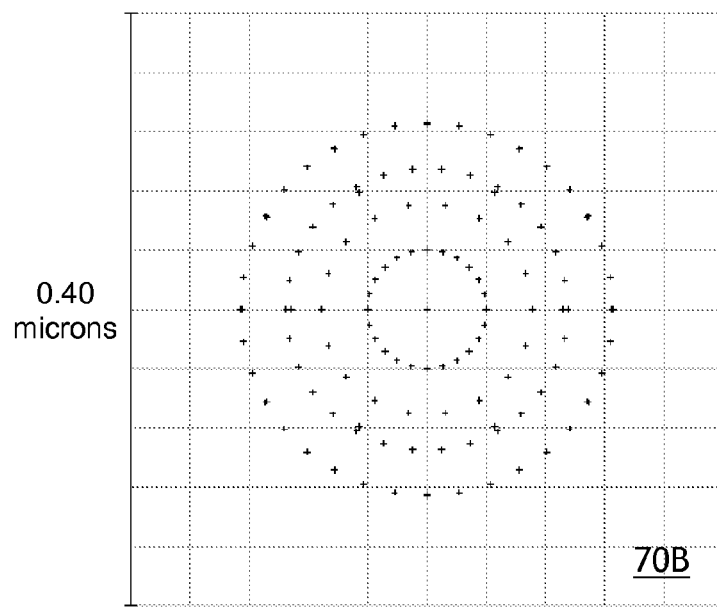

Turning now to FIGS. 7A and 7B, spot diagrams 70A and 70B in the image plane are plotted for the lens systems 50A and 50B of FIGS. 5A and 5B, respectively. One can see that the presence of the aberration corrector 50 results in about ×90 times improvement of the spot size. In FIG. 7B, the geometrical spot size is only 0.24 micrometers, which is smaller than the wavelength of the optical beam 24 (1 micrometer), indicating diffraction-limited performance.

Figure 8:
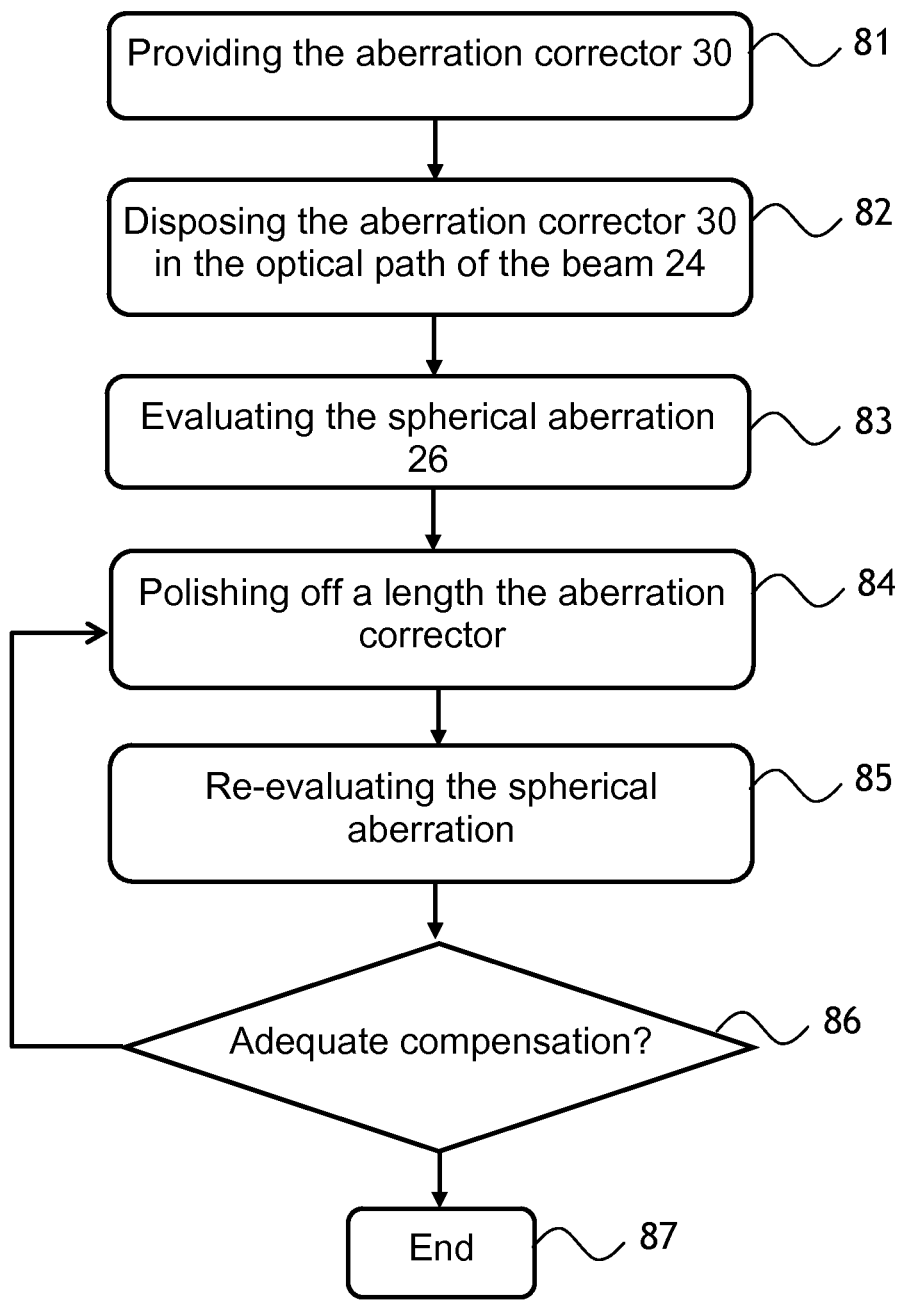
FIG. 8 is a block diagram of a method for lessening a spherical aberration according to the invention.

Referring to FIG. 8 with further reference to FIGS. 2A and 3, a method 80 for lessening the spherical aberration 26 of the collimated optical beam 24 includes a step 81 of providing the aberration corrector 30 having the optical axis 27 and the refractive index n varying with the distance r from the optical axis 27 as defined by the formula (1) above. In a step 82, the aberration corrector 30 is disposed in an optical path of the collimated optical beam 24, so that the optical axis 27 is disposed generally along the optical beam 24. Preferably, the quadratic coefficient a has a magnitude of less than $10^{-2}$ mm$^{-2}$ and more preferably less than $2 \cdot 10^{-4}$ mm$^{-2}$, and the fourth-degree coefficient b has a magnitude of at least than $10^{-6}$ mm$^{-4}$ at the wavelength of 1 micrometer.

For an embodiment where the aberration corrector 30 is either a gradient-index rod or a gradient-index fiber having at least one flat optical surface, e.g. the face 31 or 32 (FIG. 3), the method 80 can include an optional step 83, in which a first parameter characteristic of the spherical aberration 26 is measured or evaluated. By way of a non-limiting example, the step 83 can include (i) focusing the collimated beam 24 using an optical element having a focusing power e.g. the second lens 22, so as to obtain the focal spot 29; and (ii) measuring a diameter of the focal spot 29; that is, in this example the spot diameter is the first parameter characteristic of the amount of spherical aberration.

Upon completing the measuring step 83, the aberration corrector is affixed in a holder of a polishing station, and the aberration corrector 30 is polished in a step 84. A short length of the aberration corrector 30 is polished off in a direction of the optical axis 27, to reduce the thickness t by a controllable amount. Then, in a step 85, the aberration corrector 30 is placed again into the collimated optical beam 24, and the spherical aberration is re-evaluated; that is, the steps 82 and 83 are repeated. A decision is made in a step 86 whether an adequate compensation of the spherical aberration 26 has been achieved. If yes, then the procedure ends in a step 87. If not, the polishing 84 and re-evaluation 85 steps are repeated. If the aberration corrector 30 becomes too thin to be polished any further, the aberration corrector 30 can be fused to a glass rod, so that in the polishing step 84, the glass rod can be affixed in the holder of the polishing station.

The method 80 can be applied to tune a laser by lessening a spherical aberration due to thermal lensing in the gain medium of the laser, in a crystal, an absorber, or another optical element. When the laser has a thermal lens generating the spherical aberration 26 in the collimated optical beam 24, that is, in the laser beam, the spherical aberration due to self-focusing or thermal lensing can be lessened by performing steps 81 to 87 of the method 80. In the evaluation step 83, the first parameter can be laser beam spot size, or a beam quality parameter such as M-squared ($M^2$).

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An optical apparatus comprising:
   a first element having optical power when an optical beam propagates therethrough, for collimating the optical beam to produce a collimated optical beam having a wavefront, the first element comprising an absorbing or gain medium comprising a lens thermally induced therein by the optical beam, wherein the wavefront has a spherical aberration introduced by the first element upon collimating the optical beam; and
   an aberration corrector optically coupled to the first element for receiving the collimated optical beam, the aberration corrector having an optical axis disposed generally along the collimated optical beam, and a refractive index n varying with a distance r from the optical axis, as defined by a formula $$n(r) = n_0 + a \cdot r^2 + b \cdot r^4;$$

wherein $n_0$ is a constant, $a \cdot r^2$ is a radially varying second-degree refractive index component, and $b \cdot r^4$ is a radially varying fourth-degree refractive index component for lessening the spherical aberration of the collimated optical beam;
   wherein a magnitude of a is less than $10^{-2}$ mm$^{-2}$ at a wavelength of 1 micrometer, and a magnitude of b has a pre-defined magnitude of at least $10^{-6}$ mm$^{-4}$ at the wavelength of 1 micrometer.

2. The optical apparatus of claim 1, wherein the magnitude of a is less than $2 \cdot 10^{-4}$ mm$^{-2}$ at the wavelength of 1 micrometer.

3. The optical apparatus of claim 2, wherein the aberration corrector has a flat optical face for receiving or outputting the collimated optical beam.

4. The optical apparatus of claim 1, wherein a thickness of the aberration corrector is no greater than 3 mm, the apparatus further comprising a glass rod affixed to the aberration corrector, for holding the aberration corrector in a polishing station for polishing a flat optical face of the aberration corrector.

5. The optical apparatus of claim 1, wherein the first element comprises a spherical lens.

6. The optical apparatus of claim 1, wherein the aberration corrector has a thickness of substantially integer multiple of a half-pitch length defined by the parameter a.

7. An optical apparatus comprising:
a first element having optical power when an optical beam propagates therethrough, for collimating the optical beam to produce a collimated beam having a wavefront, wherein the wavefront has a spherical aberration introduced by the first element upon collimating the optical beam; and
an aberration corrector optically coupled to the first element for receiving the collimated optical beam, the aberration corrector having an optical axis disposed generally along the collimated optical beam, and a refractive index n varying with a distance r from the optical axis, as defined by a formula $$n(r)=n_0+a \cdot r^2+b \cdot r^4;$$

wherein $n_0$ is a constant, $a \cdot r^2$ is a radially varying second-degree refractive index component, and $b \cdot r^4$ is a radially varying fourth-degree refractive index component for lessening the spherical aberration of the collimated optical beam, wherein the aberration corrector includes a gradient-index rod having a diameter of no greater than 20 mm, wherein $|b| \geq 10^{-6}$ mm$^{-4}$ and $|a|<10^{-2}$ mm$^{-2}$ at a wavelength of 1 micrometer.

8. An optical apparatus comprising:
a first element having optical power when an optical beam propagates therethrough, for collimating the optical beam to produce a collimated beam having a wavefront, wherein the wavefront has a spherical aberration introduced by the first element upon collimating the optical beam; and
an aberration corrector optically coupled to the first element for receiving the collimated optical beam, the aberration corrector having an optical axis disposed generally along the collimated optical beam, and a refractive index n varying with a distance r from the optical axis, as defined by a formula $$n(r)=n_0+a \cdot r^2+b \cdot r^4;$$

wherein $n_0$ is a constant, $a \cdot r^2$ is a radially varying second-degree refractive index component, and $b \cdot r^4$ is a radially varying fourth-degree refractive index component for lessening the spherical aberration of the collimated optical beam, wherein the aberration corrector includes a gradient-index optical fiber having a diameter of no greater than 0.5 mm, wherein $|b| \geq 10^{-6}$ mm$^{-4}$ and $|a|<2 \cdot 10^{-4}$ mm$^{-2}$ at a wavelength of 1 micrometer.

9. The optical apparatus of claim 8, wherein the aberration corrector has a thickness along the optical axis, the thickness not exceeding 3 mm, the apparatus further comprising a thickness of coreless optical fiber fused to the gradient-index optical fiber.

10. A method for lessening a spherical aberration of a collimated optical beam propagating through an absorbing or gain medium comprising a lens thermally induced therein by the optical beam, the method comprising
(a) providing an aberration corrector having an optical axis and a refractive index n varying with a distance r from the optical axis, as defined by a formula $$n(r)=n_0+a \cdot r^2+b \cdot r^4;$$

wherein $n_0$ is a constant, $a \cdot r^2$ is a radially varying second-degree refractive index component, and $b \cdot r^4$ is a radially varying fourth-degree refractive index component for lessening the spherical aberration of the collimated optical beam, wherein a magnitude of a is less than $10^{-2}$ mm$^{-2}$ at a wavelength of 1 micrometer, and wherein b has a pre-defined magnitude of at least $10^{-6}$ mm$^{-4}$ at the wavelength of 1 micrometer; and
(b) disposing the aberration corrector of step (a) in an optical path of the collimated optical beam, so that the optical axis is disposed generally along the optical beam.

11. The method of claim 10, wherein the aberration corrector is selected from the group consisting of a gradient-index rod and a gradient-index fiber, the method further comprising
(c) upon completing step (b), measuring a first parameter characteristic of the spherical aberration;
(d) upon completing step (c), affixing the aberration corrector in a holder of a polishing station, and polishing off a length of the aberration corrector along the optical axis thereof;
(e) re-measuring the first parameter by repeating steps (b) and (c); and
(f) repeating steps (d) and (e) to further lessen the spherical aberration.

12. The method of claim 11, wherein step (a) includes fusing the aberration corrector to a glass rod, and wherein step (d) includes affixing the glass rod in the holder of the polishing station.

13. The method of claim 11, wherein step (c) includes
(i) focusing the collimated beam using an optical element having a focusing power, so as to obtain a focal spot; and
(ii) measuring a diameter of the focal spot of step (i),
wherein in step (c), the first parameter is the diameter of the focal spot.

14. A method of tuning a laser by lessening a spherical aberration according to the method of claim 11, the laser having therein the thermally induced lens generating the spherical aberration of a laser beam of the laser, wherein the collimated optical beam comprises the laser beam,
the method including lessening the spherical aberration of the laser beam by performing steps (a) through (f), wherein in step (c), measuring the first parameter comprises measuring an $M^2$ value of the laser beam.

* * * * *